No. 877,041.    PATENTED JAN. 21, 1908.
U. BLATTER.
PROJECTION APPARATUS.
APPLICATION FILED MAY 5, 1906.
2 SHEETS—SHEET 1.
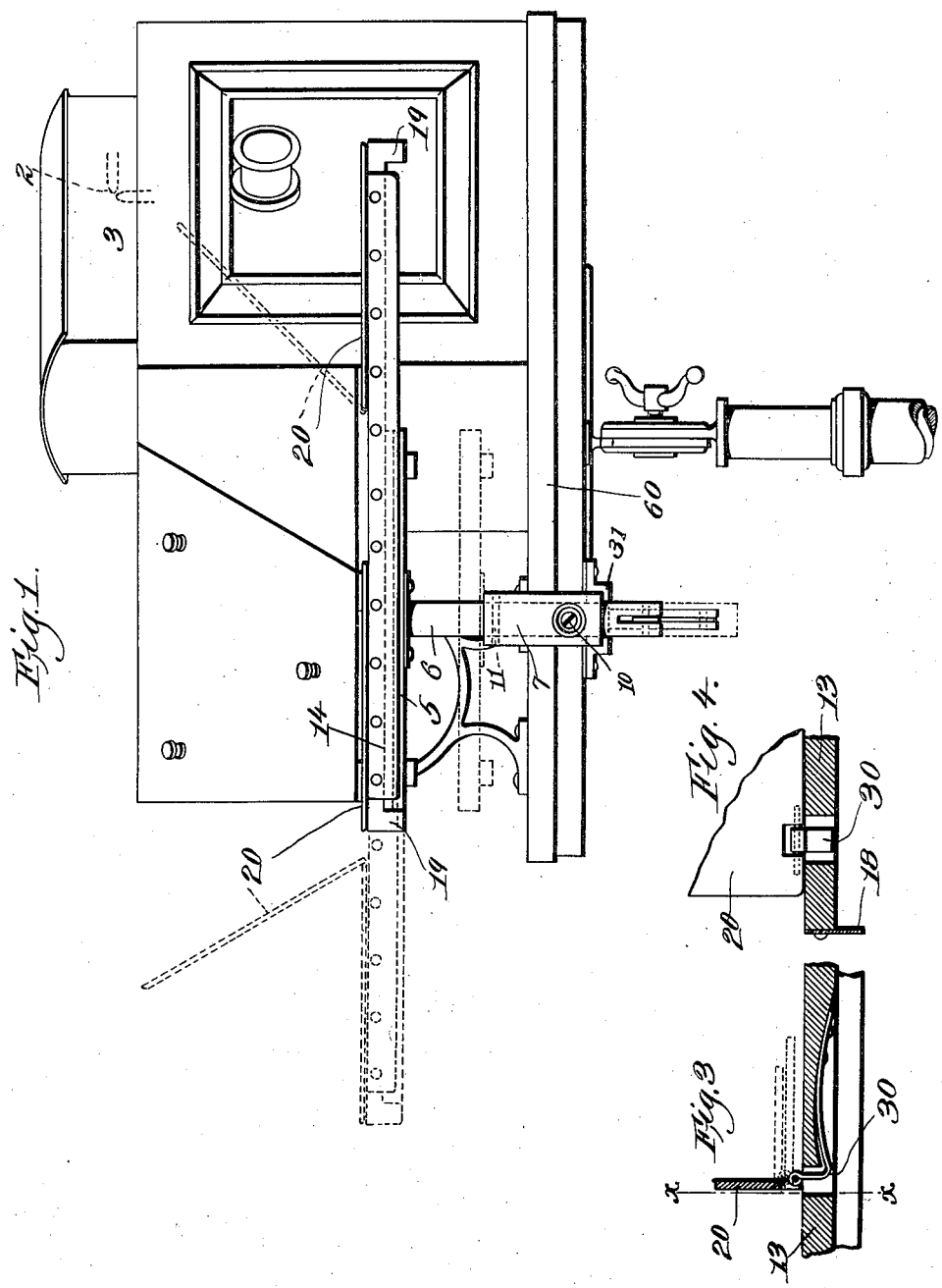

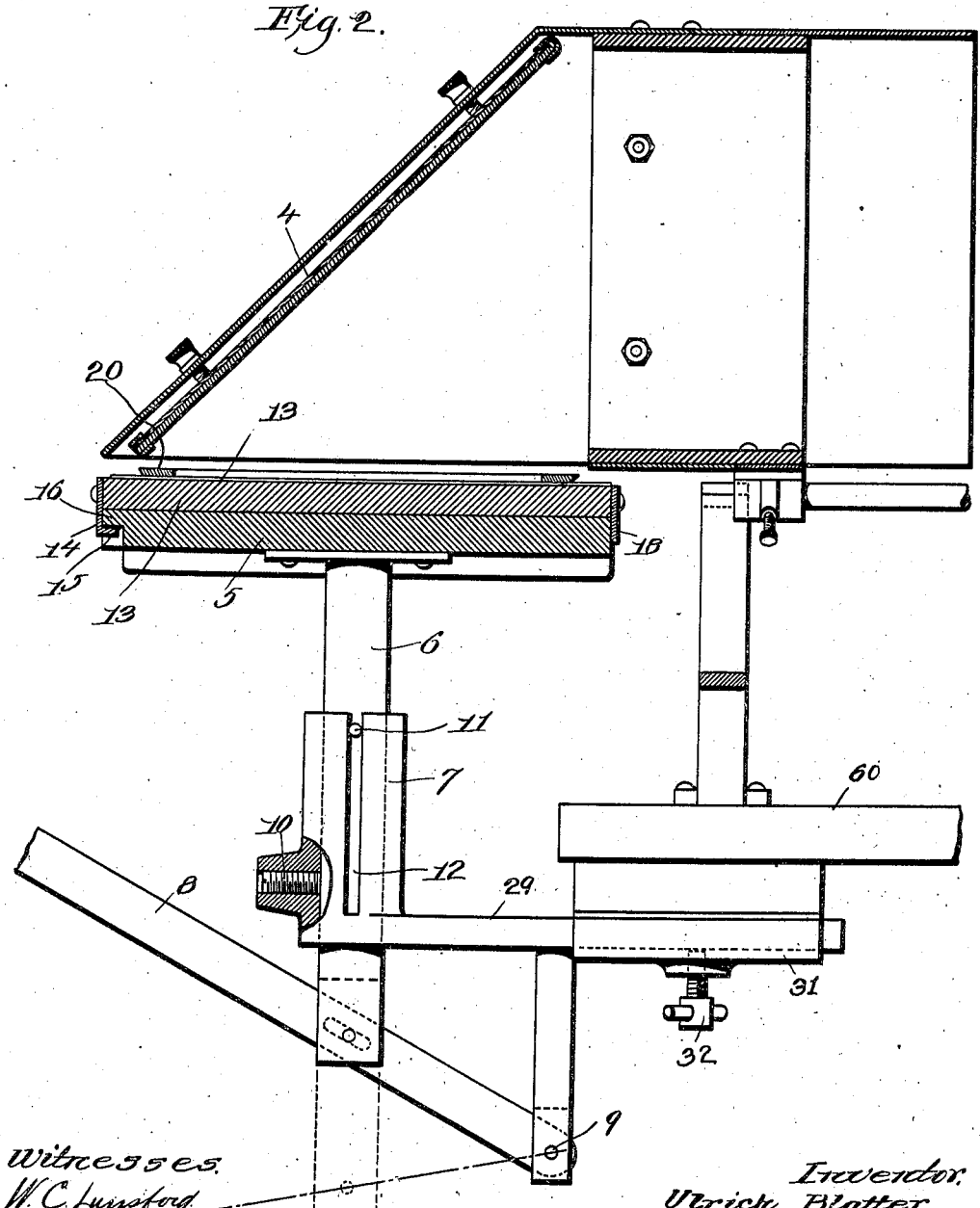

UNITED STATES PATENT OFFICE.

ULRICH BLATTER, OF BOSTON, MASSACHUSETTS, ASSIGNOR TO L. E. KNOTT APPARATUS COMPANY, OF BOSTON, MASSACHUSETTS, A CORPORATION OF MASSACHUSETTS.

PROJECTION APPARATUS.

No. 877,041.      Specification of Letters Patent.      Patented Jan. 21, 1908.

Application filed May 5, 1906. Serial No. 315,302.

*To all whom it may concern:*

Be it known that I, ULRICH BLATTER, a citizen of the United States, residing at Boston, county of Suffolk, and State of Massachusetts, have invented an Improvement in Projection Apparatus, of which the following description, in connection with the accompanying drawing, is a specification, like letters on the drawings representing like parts.

This invention relates to projection apparatus, and it has for its object to provide a novel means for supporting the object whose image is to be projected.

The invention is herein shown as embodied in projection apparatus of the type shown in the Wynne patent No. 803,385, dated October 31, 1905, though I wish it understood that it may be embodied in projection apparatus of other types. The projection apparatus illustrated and described in said patent is adapted for either opaque or transparent projection, and when used as an opaque projection apparatus, the rays from the source of illumination are reflected onto the object whose image is to be projected by a combined illuminating and erecting mirror, said mirror operating not only to reflect onto the object the illuminating rays, but also acting to reflect toward the objective light rays reflected from the object.

The table on which the object to be projected is supported is arranged horizontally so that books, vessels containing water or other liquids, or any other object the image of which it is desired to project, may be readily placed and supported thereon. The combined illuminating and erecting mirror is so disposed as to reflect onto this horizontal table the beam of light emanating from the source of illumination, and then to reflect toward the objective light rays which are reflected from the illuminated object. In accordance with my invention, I make this table capable of adjustment toward and from the combined illuminating and erecting mirror. The adjustment of this table accomplishes two functions. In the first place, it permits the table to be moved sufficiently below said mirror so as to permit the object to be readily placed thereon, and in the second place, it permits me to focus the image on the screen by simply adjusting the table to bring the object into the proper position relative to the mirror.

One embodiment of my invention will first be described and then the novel features thereof will be pointed out in the appended claims.

In the drawings, Figure 1 is a rear view of a projection apparatus, such as shown in said Wynne patent having my improvement applied thereto: Fig. 2 is a vertical section through my improved table and the combined illuminating and erecting mirror: Fig. 3 is a detail of the holder for cards and similar flat opaque objects, and Fig. 4 is a section on the line *x—x*, Fig. 3.

As stated above, this invention is designed as an improvement on the projection apparatus shown in said Wynne patent, and relates solely to the support for the opaque object. I have therefore, not shown and need not describe the projection apparatus in detail.

3 designates generally the lantern or projection apparatus which preferably is constructed as illustrated in said patent. It comprises in its construction a source of illumination 2 (shown in dotted lines Fig. 1) and a combined illuminating and erecting mirror 4 which serves to direct onto the object supported on the table the illuminating beam of light projected from the source of illumination 2, and then to reflect toward the objective the light rays reflected from the object.

5 designates the table on which the opaque object is supported, and this table is capable of adjustment toward and from the mirror 4. The adjustment of said table may be effected in any suitable way without altering the invention, and as a simple means, I have shown said table as provided with a stem 6 which extends through a holder 7 that acts as a means to guide the stem in its movement. The lower end of said stem is pivoted to an operating lever 8 which in turn is pivoted to a fixed support, as at 9. With this construction it will be seen that by turning the operating lever 8 about its pivot 9, the table 5 may be adjusted vertically into any desired position.

Any suitable means may be employed for holding the table in its adjusted position, and as a simple means for this purpose I have provided sufficient frictional contact between the holder 7 and the stem 8 to hold the table in any adjusted position. The stem is made of a size to fit snugly in the tubular holder, and a set-screw 10 may be employed if desired to furnish sufficient friction to hold the stem in its adjusted position. The stem is shown as having a projection 11 extending therefrom which works in a slot 12 in the holder, thus furnishing a suitable means for guiding the stem in its movement.

The drawings show a sliding holder 13 mounted on the table. This holder is especially designed for receiving or holding cards or other flat objects that are to be projected. It is herein shown as long enough to support two objects, and as slidably mounted on the table. Said holder 13 has at one side a flange 14 provided with a lip 15 to be received under a lip 16 formed on the table 5, and the other side has a flange 18 which overlies the edge of the table. These flanges guide the holder 13 in its longitudinal movement. Each end of the holder 13 is provided with a projection 19 which is adapted to abut the end of the table, as shown in Fig. 1, and thus to limit its sliding movement.

20 designate flaps hinged to the holder 13 and adapted to receive under them the card or other flat opaque object. These flaps are preferably cut out in their center, as shown in Fig. 2, so as to expose the portion of the card or the flat object which is to be projected, said flap being merely for the purpose of holding the card in place. These flaps are shown as being yieldingly hinged to the holder so as to accommodate cards of different thicknesses. Referring now to Figs. 3 and 4, it will be seen that the flaps are hinged to spring members 30 which are carried by the holder and which yield somewhat when the flap is folded down onto the holder. In this way, the flaps are firmly pressed against the cards or other flat objects and hold them firmly in place.

The holder 13 may be shifted from the full to the dotted line position, Fig. 1. When in the full-line position, the card at the left-hand end of said holder may be projected on the screen, and during this time each new card may be placed under the flap at the right-end of the holder. The holder 13 may then be shifted into the dotted line position to bring the new card into position beneath the mirror 4. In case a book or other object is to be projected on the screen, the holder 13 will be removed from the table and a book or other object laid directly on the table. Whenever the object on the table is to be changed, said table may be moved into the dotted line position Fig. 1 by depressing the lever 8, and after the new object has been placed on the table it may be raised into position to correctly position the surface of the object with relation to the mirror 4.

The focusing of the image may be accomplished by vertically adjusting the table 5 instead of manipulating the objective lens as is done in most projection apparatus.

Making the table 5 vertically adjustable, therefore, accomplishes two purposes, first, it permits the table to be lowered sufficiently below the mirror 4 so as to permit objects of any kind to be placed thereon, and second, it furnishes a means for quickly and readily focusing the image by the same movement that brings the table back into its proper position.

Where the table is held in place by friction, as herein shown, no separate motion is required to lock or unlock the table, and the table will be automatically held in whatever position it is left.

I have also provided herein for adjusting the table 5 longitudinally as well as vertically. For this purpose the holder 7 is carried by a foot 29, which is adjustably sustained by the table 60 that supports the projection apparatus 3. For this purpose the table 60 has the bracket 31 secured thereto in which said foot 29 is mounted for horizontal adjustment, said foot being held in place by any suitable means, such as a set screw 32.

I have herein attempted to show and describe one embodiment only of my invention, and although I have shown it as used in connection with the Wynne projection apparatus, yet it will be obvious that it may be used in connection with projection apparatus of other types.

Having fully described one embodiment of my invention, what I claim as new and desire to secure by Letters Patent is;—

1. In a projection apparatus, the combination with means to project the image of an object, which means includes means to direct light rays on to said object, of an object-supporting table having a stem 6, a tubular holder through which said stem passes, and an operating lever pivotally connected to said stem below the table for raising and lowering the latter.

2. In a projection apparatus, the combination with means to project the image of an object, which means includes means to direct light rays on to said object, of an object-supporting table having a stem 6, a tubular holder through which said stem passes, and an operating lever pivotally connected to said stem below the table for raising and lowering the latter, said tubular holder having means for frictionally holding the table in any adjusted position, and means for preventing said table from turning.

3. In a projection apparatus, the combination with means to project the image of an object, which means includes means to direct light rays on to said object, of a horizontally-adjustable bracket having a tubular holder, a horizontal object-supporting table having a stem extending through said tubular holder, and a lever pivotally connected to the bracket and to the stem for vertically adjusting the table.

4. In a projection apparatus, the combination with means to project the image of an object, which means includes means to direct light rays on to said object, of a horizontally-adjustable bracket having a tubular holder, a horizontal object-supporting table having a stem extending through said tubular holders a lever pivotally connected to the bracket and to the stem for vertically adjusting the table, and an object holder slidably mounted on the table and having provision for sustaining a plurality of objects.

In testimony whereof, I have signed my name to this specification, in the presence of two subscribing witnesses.

ULRICH BLATTER.

Witnesses:
   NEWELL D. PARKER,
   L. E. KNOTT.